(12) United States Patent
Khale et al.

(10) Patent No.: US 10,989,251 B2
(45) Date of Patent: Apr. 27, 2021

(54) FRICTION CLUTCH MECHANISM

(71) Applicant: Robert Bosch Automotive Steering LLC, Plymouth, MI (US)

(72) Inventors: Pritish Khale, Florence, KY (US); Oliver Perichon, Independence, KY (US)

(73) Assignee: Robert Bosch Automotive Steering LLC, Plymouth, MI (US)

( * ) Notice: Subject to any disclaimer, the term of this patent is extended or adjusted under 35 U.S.C. 154(b) by 25 days.

(21) Appl. No.: 16/347,428

(22) PCT Filed: Nov. 15, 2017

(86) PCT No.: PCT/US2017/061772
§ 371 (c)(1),
(2) Date: May 3, 2019

(87) PCT Pub. No.: WO2018/093878
PCT Pub. Date: May 24, 2018

(65) Prior Publication Data
US 2019/0257366 A1 Aug. 22, 2019

Related U.S. Application Data

(60) Provisional application No. 62/423,513, filed on Nov. 17, 2016.

(51) Int. Cl.
| *F16D 7/02* | (2006.01) |
| *B60R 25/021* | (2013.01) |
| *B62D 1/20* | (2006.01) |
| *B62D 5/04* | (2006.01) |
| *B62D 1/28* | (2006.01) |

(52) U.S. Cl.
CPC ........ *F16D 7/025* (2013.01); *B60R 25/02107* (2013.01); *B62D 1/20* (2013.01); *B62D 1/286* (2013.01); *B62D 5/043* (2013.01)

(58) Field of Classification Search
None
See application file for complete search history.

(56) References Cited

U.S. PATENT DOCUMENTS

| 3,605,443 A | 9/1971 | Redelman | |
| 2006/0043722 A1* | 3/2006 | Hoshino | B62D 1/195 280/777 |
| 2013/0133462 A1* | 5/2013 | Yamamoto | B62D 1/184 74/493 |

(Continued)

FOREIGN PATENT DOCUMENTS

| CN | 101925499 A | 12/2010 |
| CN | 105517876 A | 4/2016 |

(Continued)

OTHER PUBLICATIONS

International Search Report and the Written Opinion of the International Searching Authority, dated Apr. 18, 2018; Intl. Appl. No. PCT/US2017/061772.

(Continued)

*Primary Examiner* — Timothy Hannon
(74) *Attorney, Agent, or Firm* — Michael Best & Friedrich LLP

(57) ABSTRACT

A friction clutch mechanism for a steering column of a vehicle is disclosed.

18 Claims, 14 Drawing Sheets

(56) References Cited

U.S. PATENT DOCUMENTS

2015/0191198 A1    7/2015  Perichon
2016/0009311 A1    1/2016  Khale et al.

FOREIGN PATENT DOCUMENTS

FR       2770472 A1      5/1999
JP      57129952 A       8/1982
WO    2016007711 A1      1/2016

OTHER PUBLICATIONS

Translation of National Intellectual Property Administration, P.R. China Search Report for Application No. 201780070987.6 dated Dec. 17, 2020 (3 pages).

* cited by examiner

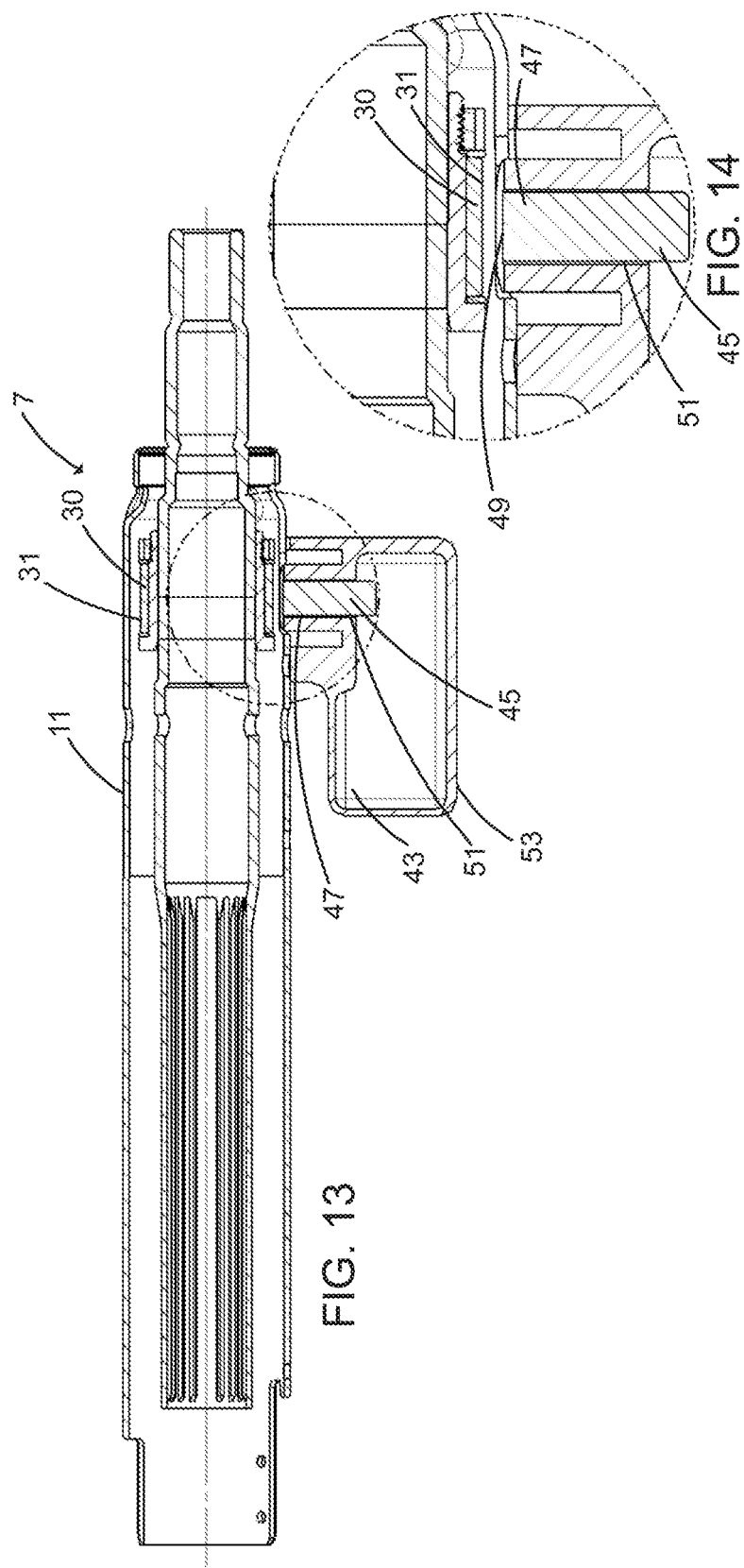

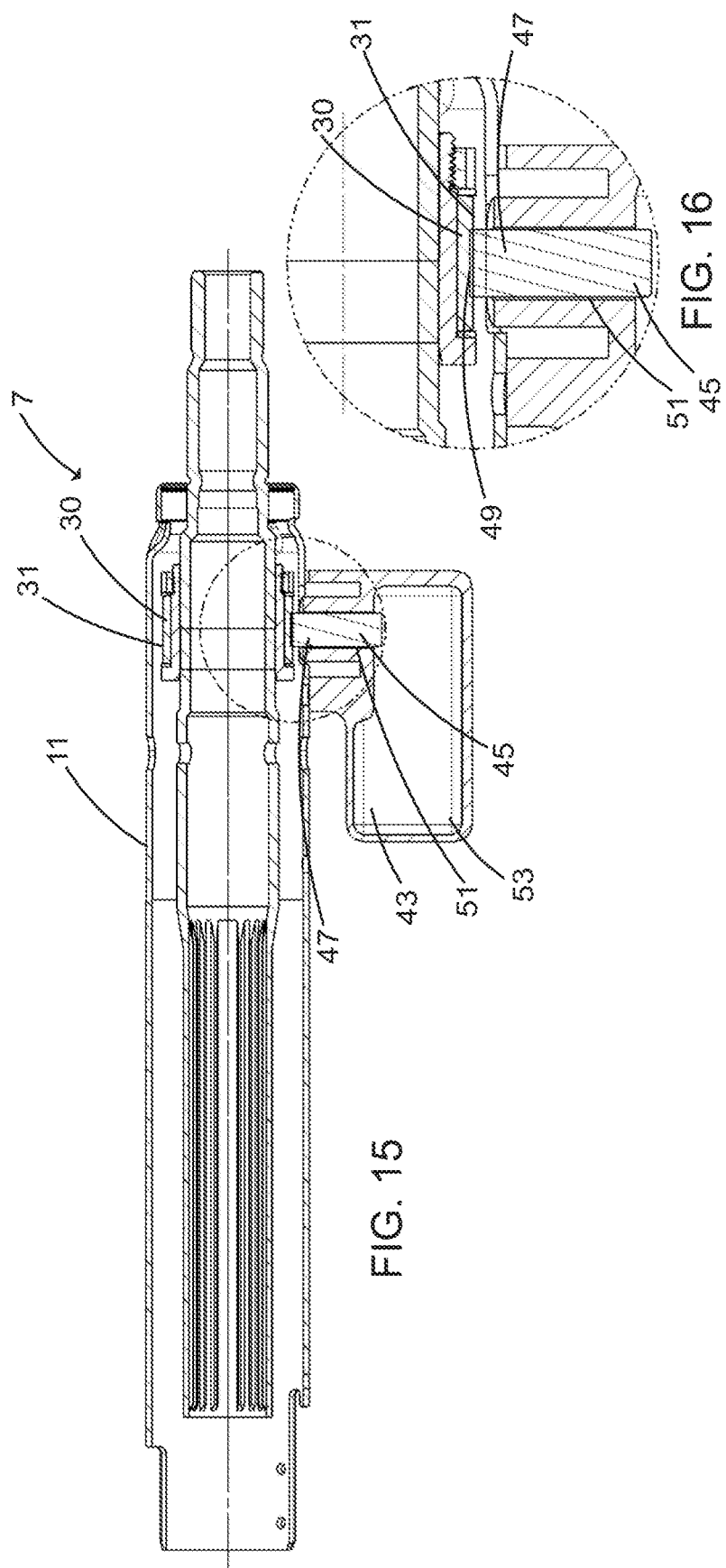

FRICTION CLUTCH MECHANISM

BACKGROUND OF THE INVENTION

The invention is directed to a friction clutch mechanism that can be used in a steering system of a vehicle. In vehicles there is a need to retain a direction for the vehicle if there is a difficulty, such as a failure of the steering system. Keeping the vehicle on a known direction is helpful in avoiding additional complications from the original problem. It is also desirable that the operator of the vehicle can reclaim control of the steering of the vehicle once the problem has been recognized.

SUMMARY OF THE INVENTION

A friction clutch mechanism for a steering column of a vehicle is disclosed.

Other objects and advantages of the present invention will become apparent to those skilled in the art upon a review of the following detailed description of the preferred embodiments and the accompanying drawings.

IN THE DRAWINGS

FIG. 13 is a cross sectional side elevational view of a component of the invention.

FIG. 14 is an exploded cross sectional side elevational view.

FIG. 15 is a cross sectional side elevational view.

FIG. 16 is an exploded cross sectional side elevational view

DETAILED DESCRIPTION OF THE INVENTION

The invention is directed to a friction clutch mechanism that can be used to control the motion of a steering column in a vehicle. Under certain conditions, such as a failure of the steering system, the clutch can be engaged to hold the steering in place and to maintain the vehicle on a steady direction. The steering system will be held in place until the user of the vehicle overcomes the friction load of the clutch whereby the operator of the vehicle will resume control of the steering system for the vehicle. The details of the invention will be more readily understood by referring to the attached drawings in connection with the following description.

Figure 1:
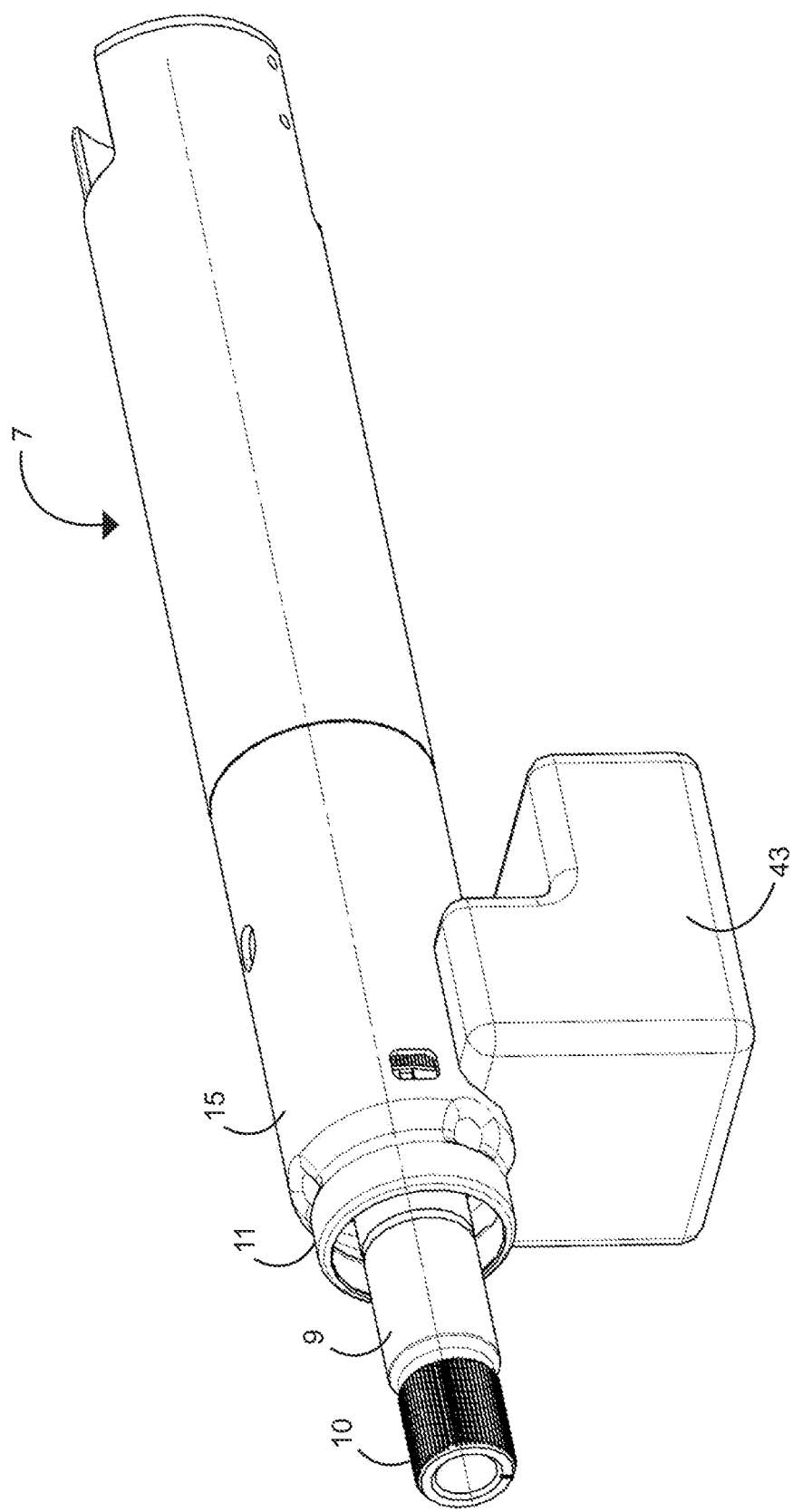
FIG. 1 is a side perspective view of the invention.
Figure 2:
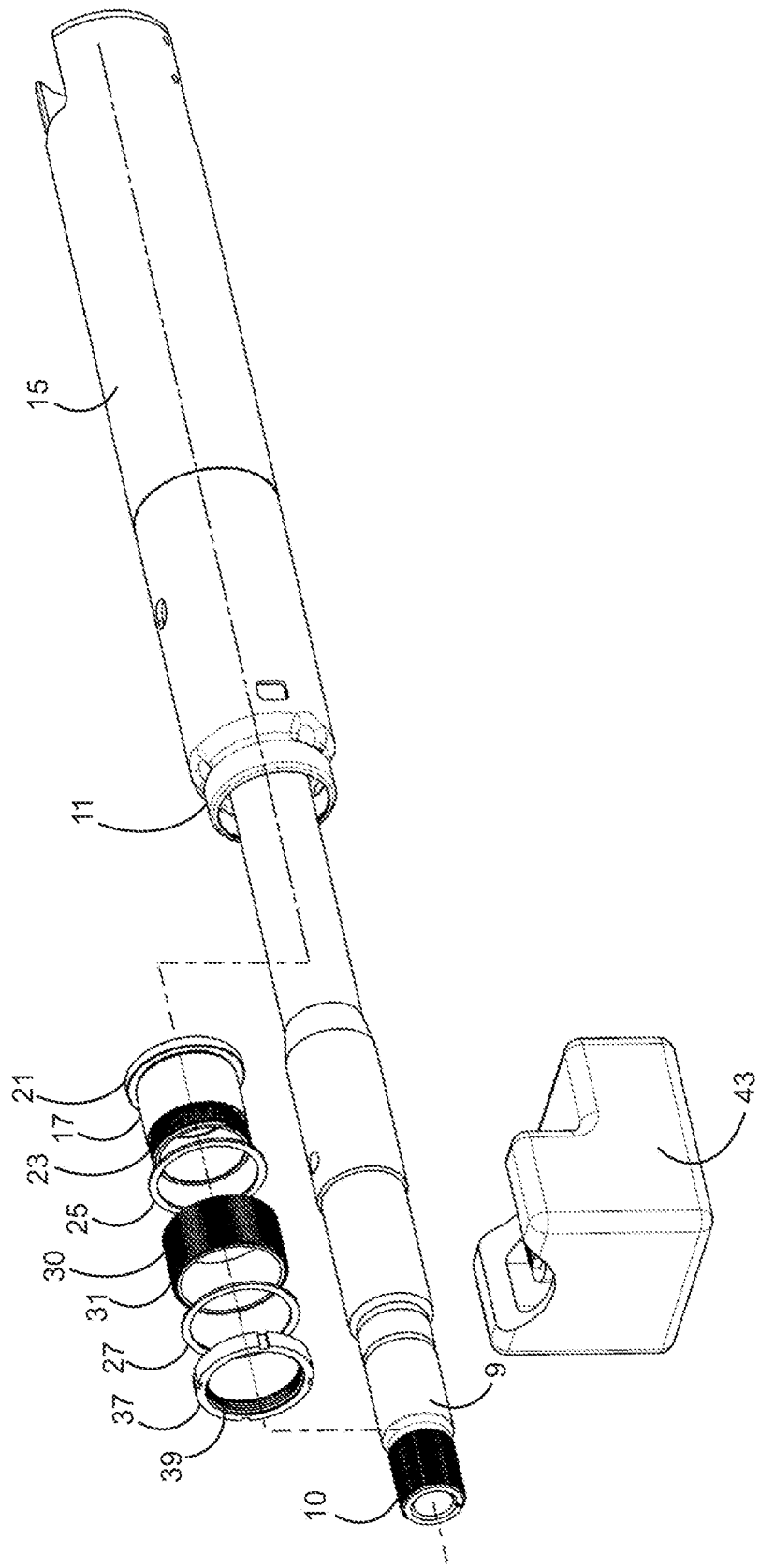
FIG. 2 is an exploded side perspective side elevational view.
Figure 3:
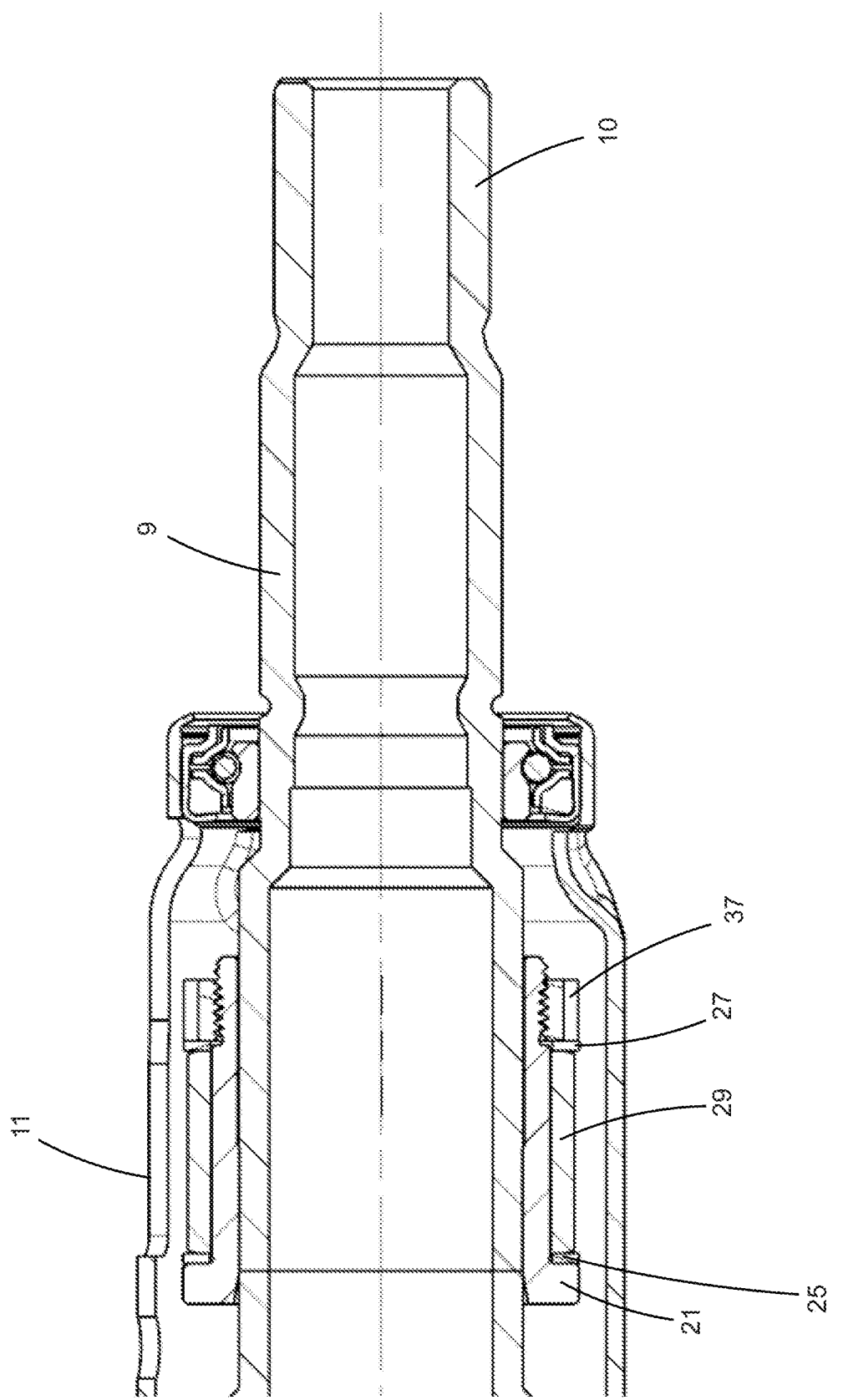
FIG. 3 is a partial side elevational view.
Figure 4:
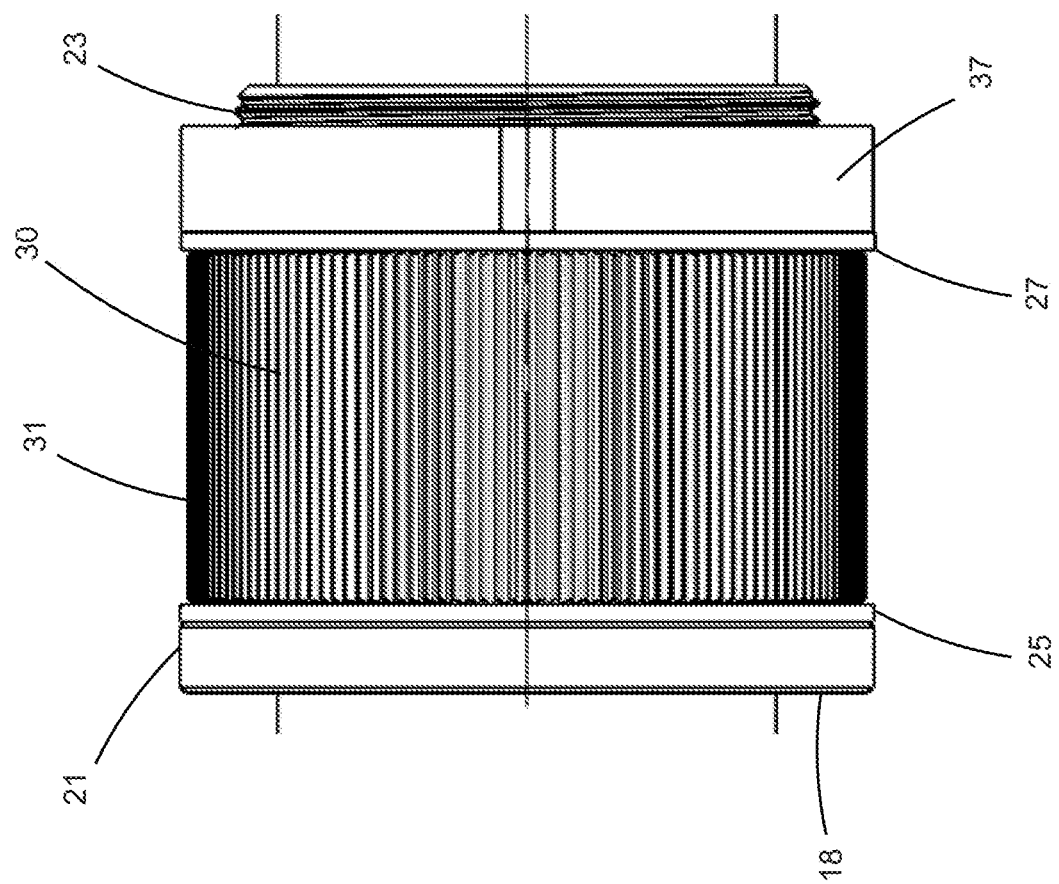
FIG. 4 is a cross sectional side elevational view of the invention.
Figure 5:
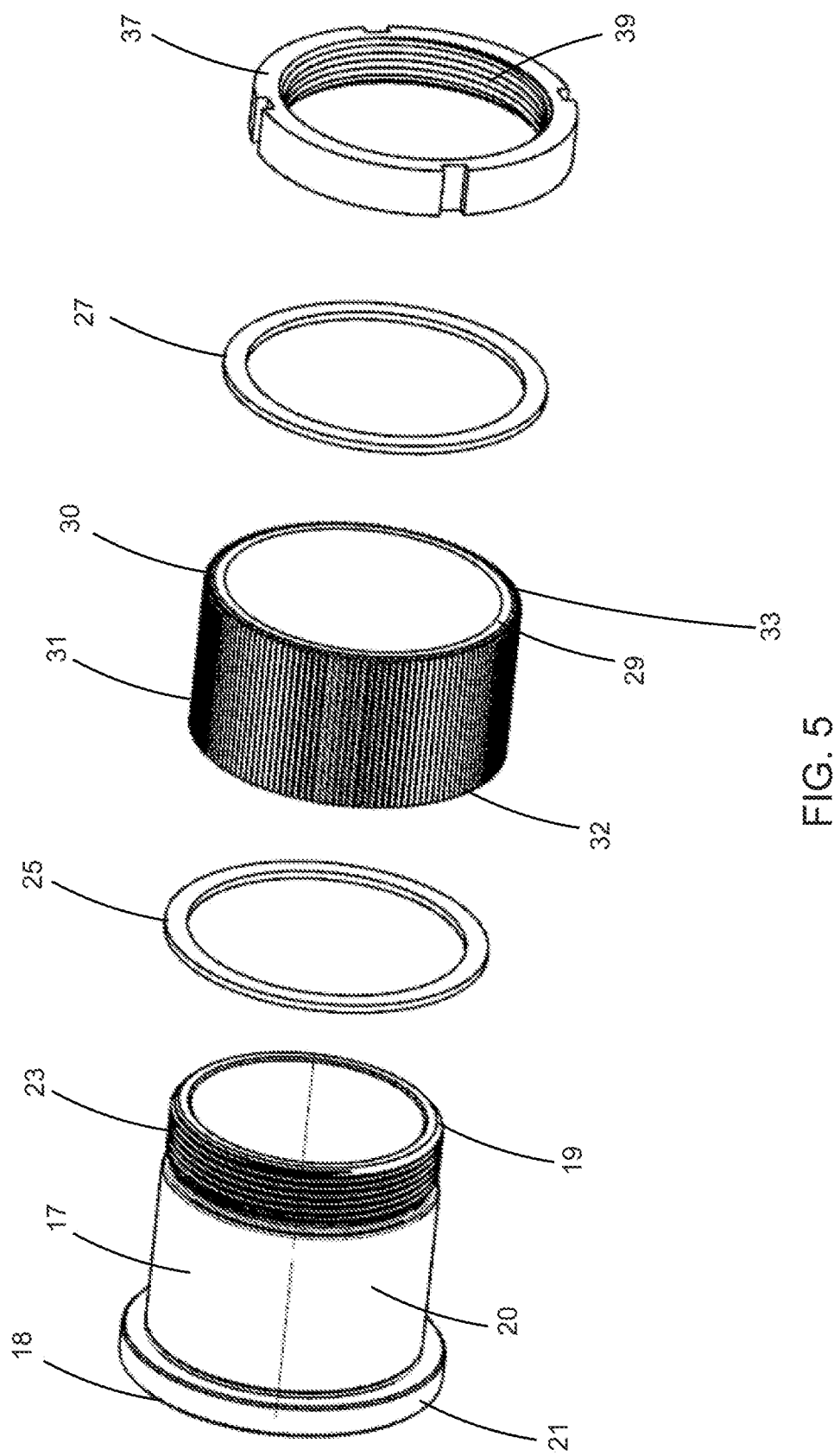
FIG. 5 is an exploded perspective view of components of the invention.

The friction clutch mechanism 5, as shown in FIGS. 1-5, is part of a steering column 7 that is used to control the steered wheels of a vehicle in a manner well known in the art. The steering column 7 includes a steering shaft 9 that is positioned in a tube 11 and the tube 11 is positioned in a jacket body 15. The jacket body 15 is secured to the vehicle in a manner well known in the art. The end of the steering shaft 9 that extends from the tube 11 has a first end 10 that is designed to be secured to a steering wheel wherein the steering wheel can be utilized to rotate the steering shaft to control the steered wheels of the vehicle.

Within the tube 11 a sleeve 17 is positioned around the steering column 9. The sleeve 17 is designed to engage the steering shaft 9 so that rotation of the steering shaft 9 will cause the sleeve 17 to also rotate. The sleeve has a first end 18 and a second end 19. A shoulder 21 is formed in the sleeve 17 on the first end 18 and a plurality of threads 23 are positioned on the second end 19 of the sleeve. A first friction washer 25 is positioned over the sleeve 17 and rests against the shoulder 21 on the first end 18. A lock collar 29 having a plurality of teeth 31 positioned on the outer surface 30 is positioned on the sleeve 17. The lock collar has a first end 32 that is positioned against the first friction washer 25. A second friction washer 27 is positioned on the sleeve 17 and is in engagement with the second end 33 of the lock collar 29. The first and second friction washers and the lock collar 29 are rotatably positioned on the outer surface 20 of the sleeve 17. A locking nut 37 having a plurality of threads 39 is positioned on the sleeve 17 with the plurality of threads 39 on the locking nut 37 engaging the plurality of threads 23 on the second end 19 of the sleeve. The locking nut 37 also engages the side of the second friction washer 27 that is spaced apart from the lock collar 29. The locking nut 37 is designed to place a biasing force from about 600 N (Newtons) to about 4,500 N against the second friction washer 27 which will cause the second friction washer to engage the second end 33 of the lock collar 29 which causes the first end 32 of the lock collar to engage the first friction washer 25. The biasing force created by the lock nut can be adjusted by how far the lock nut is threaded onto the threads of the sleeve. The biasing force from the lock nut 37 will therefore, cause the first friction washer 25 to engage the shoulder 21 on the sleeve 17. A friction force from about 90 N to about 1500 N will be created between first and second friction washers and the lock collar 29. The biasing force and friction force can be increased or decreased based on the needs of the vehicle manufacturer. The size of the components, the materials used and the tightness of the lock nut will allow the friction clutch to be fine-tuned for the particular requirements of the vehicle. This tunability feature further enhances the usability of the friction clutch for a variety of vehicles and vehicle manufacturers.

Figure 12:
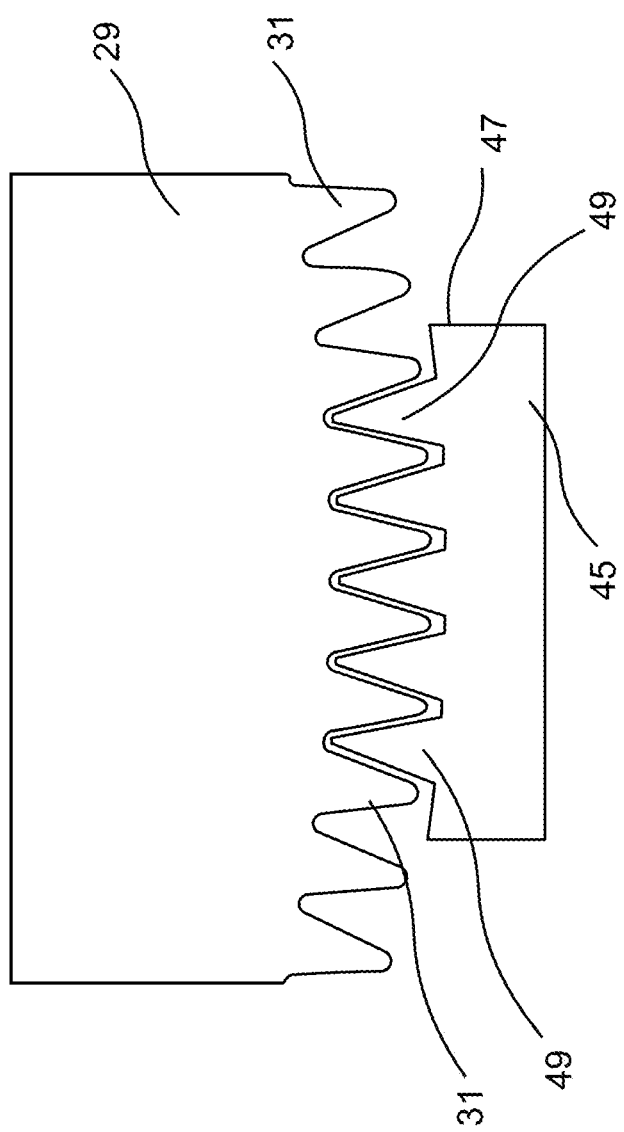
FIG. 12 is an exploded perspective view of components of the invention.

Positioned adjacent the tube 11 of the steering column 7, as shown in FIGS. 12-16, is an external controller 43. The external controller contains a bolt 45 having a first end 47 and the first end has a plurality of teeth 49 that are designed to meshingly engage with the plurality of teeth 31 on the lock collar 29. The bolt 45 is moveably positioned in a bore 51 in housing 53 for the controller. A drive mechanism can be positioned in the housing of the controller 43 to cause the bolt 45 to move in a direction towards and away from the lock collar 29. The figures show the bolt 45 were the plurality of teeth 49 are mateingly engaged with the lock collar and where the bolt 45 is spaced apart from the lock collar. Various drive mechanisms, known in the art, can be used to cause the bolt 45 to move in the bore 51. The external controller 43 can be engaged to advance the bolt 39 in a direction towards the steering column 7 so that the plurality of teeth 49 on the first end 47 of the bolt 45 engage the teeth 31 on the lock collar 29.

In the operation of the vehicle there may be occasions when it is desired to maintain the steering position of the vehicle for a period of time. As an example, if there is a failure in the steering system it may be desirable to maintain the current steering position for the vehicle until corrective action can be taken. Under such circumstances, the external controller can be activated to advance the bolt 45 to engage the lock collar 29. The engagement of the bolt 45 will prevent the lock collar from rotating. As the lock collar 29 is secured to the sleeve 17 by the biasing force provided by the locking nut 37 and the first and second friction washers 25, 27, the sleeve 17 will be held in position against rotation by the engagement of the bolt 45 with the lock collar 29. As the sleeve 17 is secured to the steering shaft 9 of the steering column 7, the steering shaft 9 will be held in fixed position by the activation of the bolt 45 in the external controller 43.

If it is desired to change the position of the steered wheels of the vehicle, it will be necessary for the user of the vehicle to engage the steering wheel attached to the steering shaft 9 and provide a rotational force to the steering wheel that is larger than the friction force provided against the lock collar 29 by the first and second friction washers by the locking nut 37. Once the rotational force applied to the steering wheel exceeds the friction force, the sleeve 17 will be able to rotate with respect to the lock collar 29 in the steering of the vehicle will be controlled by the user of the vehicle. The friction between the first and second friction washers and the lock collar 29 provided by the biasing force generated by the locking nut 37 will increase the force necessary to rotate the steering wheel so that the user of the vehicle will be aware that there is a problem with the steering system and should take appropriate action to address the problems in the steering system. The level of the friction that must be overcome to resume manual steering of the vehicle can be selected by the position of the locking nut 37 on the sleeve 17. Once the locking nut is in the desired position, the level of friction is established and maintained. The locking nut can include a thread locking feature, which once engaged will prevent the locking nut from moving on the sleeve 17. This feature of the locking nut functions to ensure that the desired force produced by the locking nut is maintained. The more that the locking nut is advanced on the pluralities of thread 23 on the sleeve 17, the larger the biasing force that is exerted against the locking collar 29 by the first and second friction washers and the higher the friction loads will be generated by the first and second friction washers that must be overcome to disengage the sleeve 17 from the locking collar 29. It should also be appreciated that the friction material of the first and second friction washers can be modified or changed to adjust the torque value that is achieved by the locking nut and friction washer interaction. This further allows the friction clutch to be able to produce the level of resistance desired in the steering system.

Figure 6:
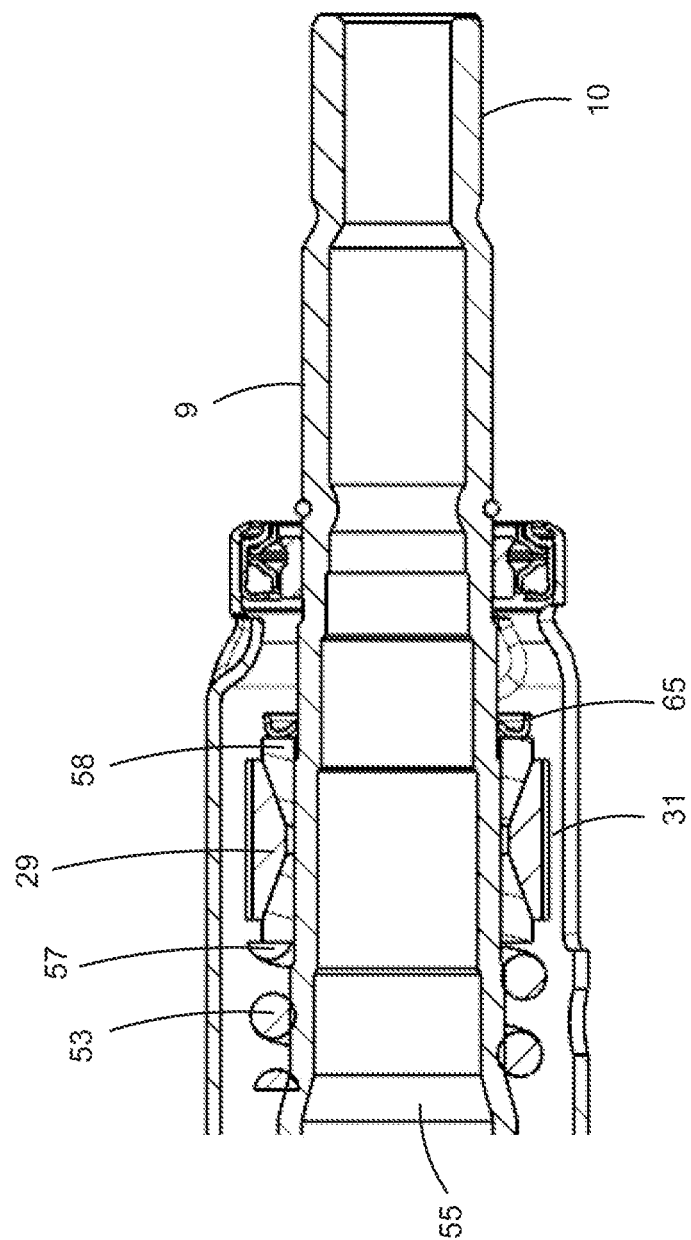
FIG. 6 is a cross sectional side elevational view.
Figure 7:
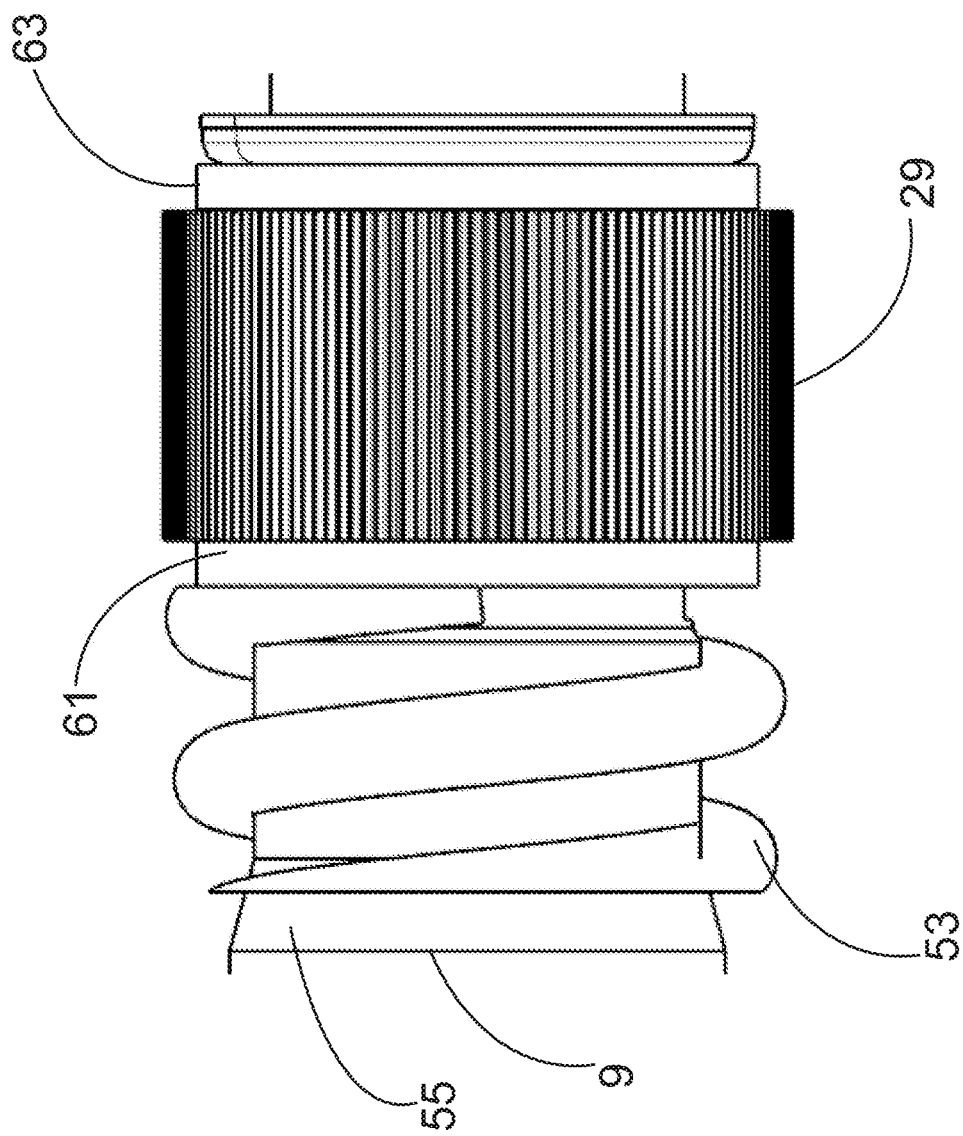
FIG. 7 is a partial side elevational view.
Figure 8:
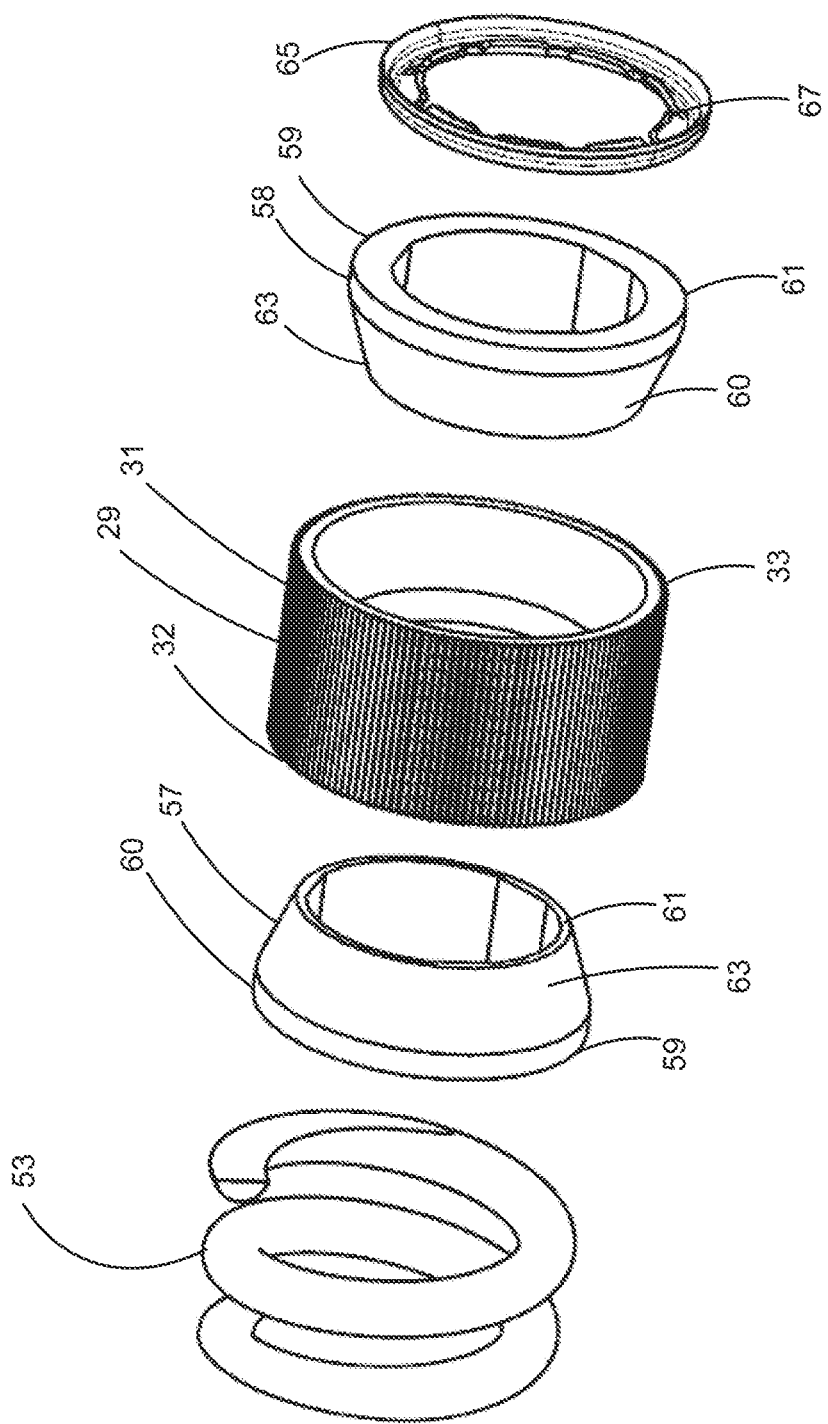
FIG. 8 is an exploded perspective view of components of the invention.

FIGS. 1 and 6-8 show an alternative system that can be used to control the position of the steering of the vehicle. The mechanism of these figures is similar to the previously described mechanism and similar components will not be described in as much detail as this detail has been previously provided.

In this alternative, a coil spring 53 is positioned on the steering shaft 9 and the steering shaft has a shoulder 55 that is disposed for engaging one end of the coil spring 53. A first friction wedge 57 is positioned on the shaft. The first friction wedge has a flange 59 on the first end 60 and the flange is disposed to engage the end of the coil spring 53 that is spaced apart from the shoulder 55. The surface 63 of the first friction wedge 57 extends in a conical shape from the first end 60 to the second end 61 so that the diameter of the first friction wedge gradually decreases from the first end 60 to the second end 61. A lock collar 29 having a plurality of teeth 31 on the outer surface is positioned on the steering shaft 9 and the first end 32 of the lock collar is designed to mateingly engage the conical surface 63 of the first friction wedge 57. A second friction wedge 58, having the same shape as the previously discussed first friction wedge 57, is positioned on the steering shaft 9. The conical surface 63 of the second friction wedge is designed to engage the interior of the second end 33 of the lock collar 29. A no-back washer having a plurality of engagement teeth 67 is positioned on the steering shaft 9 adjacent the flange 59 on the second end 61 of the second friction wedge 58. The first and second friction wedges 57, 59 are secured to the steering shaft 9 so that the first and second friction wedges rotate when the steering shaft is caused to rotate. The no-back washer 65 is designed to be moveably positioned on the steering shaft 9 so that the second friction wedge 59 will engage the lock collar 29 and the first friction wedge 57 will frictionally engage the first end of the lock collar 29 and the coil spring 53 will be compressed. The level of biasing force created by the coil spring 53 is determined by the position of the no-back washer 65 on the steering shaft 9. As the no-back washer is advanced toward the coil spring 53 the biasing force will increase. Once the no-back washer is in the desired position, the level of friction is established and maintained. The design of the no-back washer allows it to stay in the desired position on the shaft once the no-back washer is advanced to the desired position on the shaft. A biasing force from the coil spring of about 170 N to about 1600 N has been found to be adequate. The first and second friction wedges will create a friction force from about 42 N to about 240 N that secures the lock collar 29 to the first and second friction wedges. This friction force will cause the lock collar 29 to rotate with the first and second friction wedges as the steering shaft 9 is rotated. The biasing force and friction force can be increased or decreased based on the needs of the vehicle manufacturer. The size of the components, the materials used and the tightness of the no-lock washer will allow the friction clutch to be fine-tuned for the particular requirements of the vehicle. This tunability feature further enhances the usability of the friction clutch for a variety of vehicles and vehicle manufacturers.

An external controller 43, as shown in FIGS. 12-16, having a bolt 45 is positioned adjacent the steering column 7 in the manner previously described. Engagement of the external controller 43 will cause the bolt 45 to engage the lock collar 29 in the manner previously described. The engagement of the bolt 45 with the lock collar will prevent the lock collar from rotating which will prevent the first and second friction wedges and the steering shaft 9 from rotating. If it is desired to gain control of the steering system it will be necessary to provide a level of force in the steering wheel connected to the steering shaft 9 to overcome the frictional forces between the two friction wedges 57, 58 and the lock collar 29. In all other manners the mechanism disclosed in FIGS. 6-8 functions in the same manners as the mechanism described in FIGS. 1-5.

Figure 9:
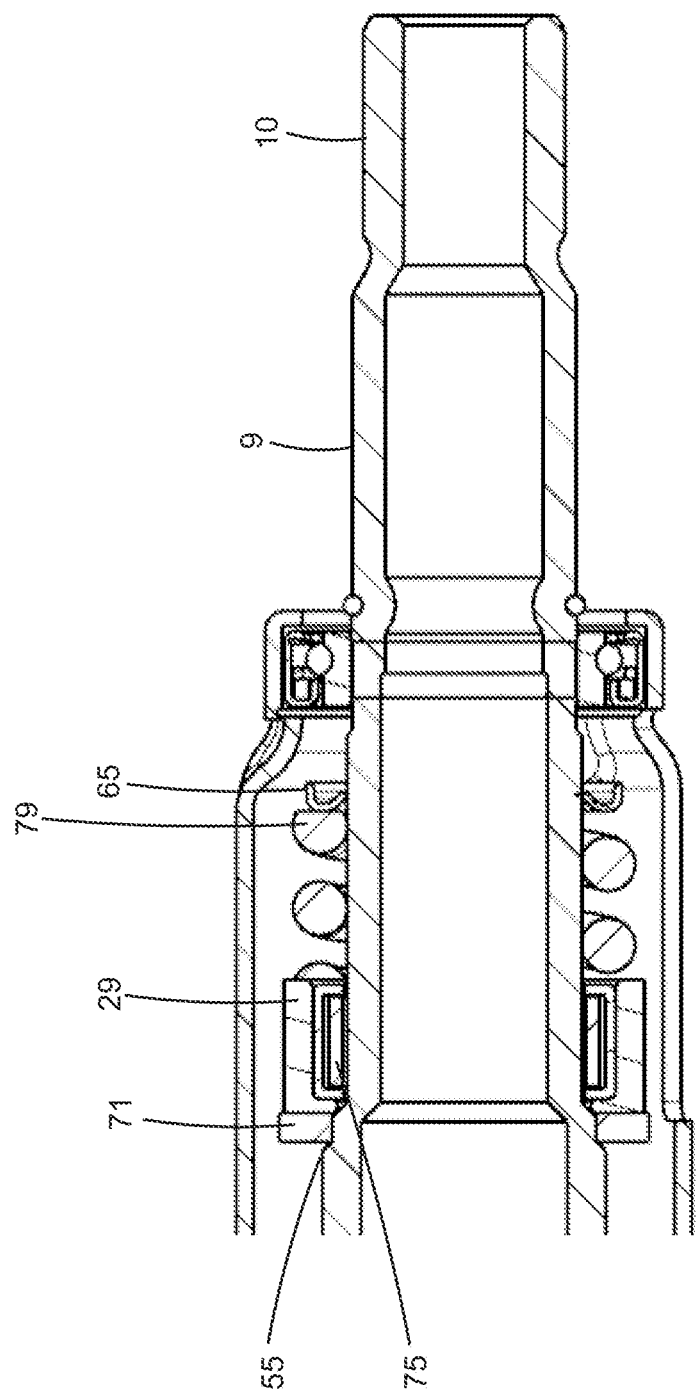
FIG. 9 is a side cross sectional elevational view of the invention.
Figure 10:
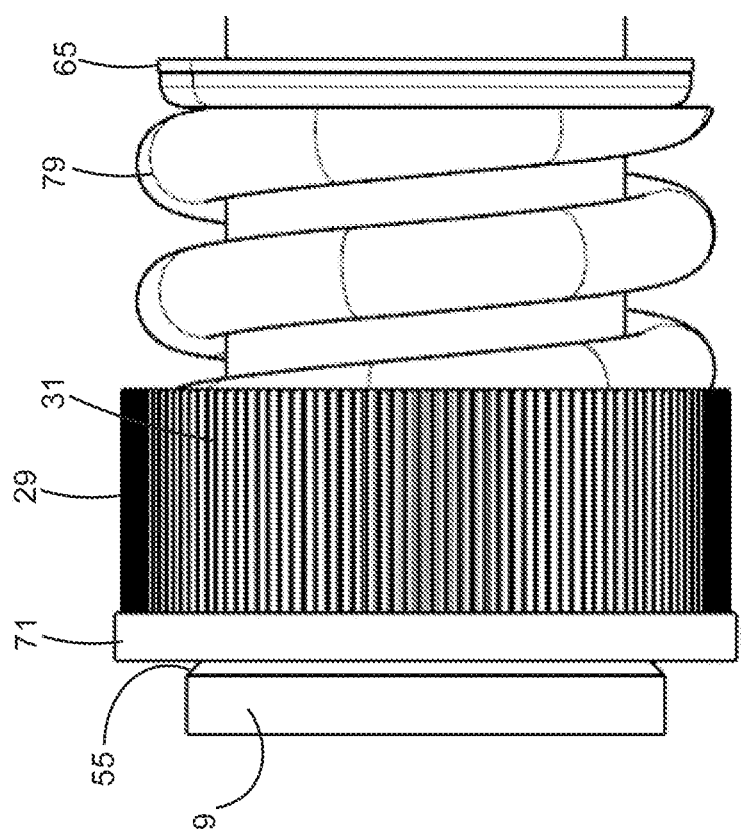
FIG. 10 is a partial cross sectional side elevational view.
Figure 11:
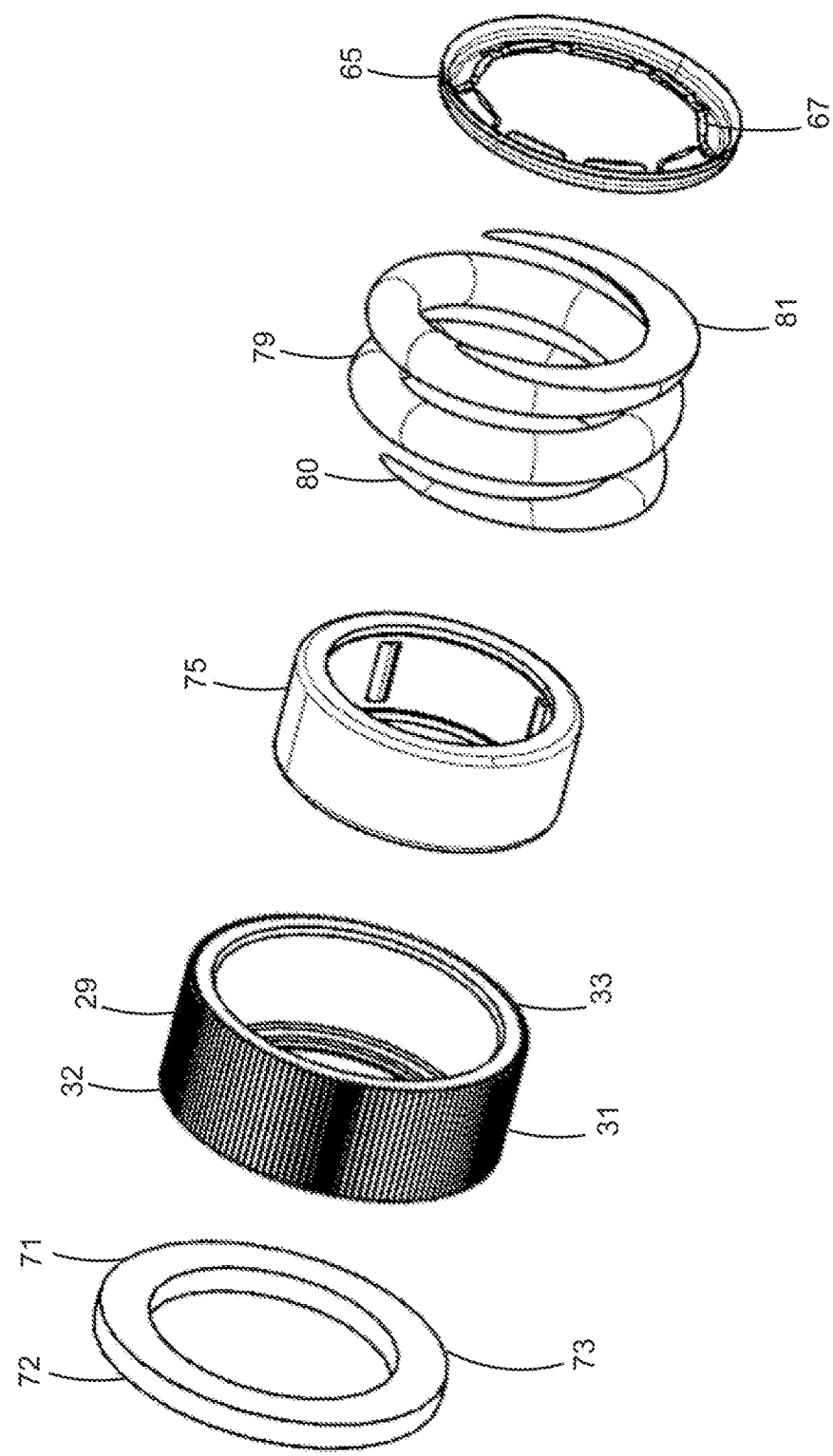
FIG. 11 is an exploded perspective.

FIGS. 1 and 9-11 show another alternative for the friction clutch mechanism of this invention. In this alternative, a friction plate 71 is securely positioned on the steering shaft 9 that is located in the steering column 7. A shoulder 55 is positioned on the steering shaft 9 to engage the first side 72 of the friction plate. A lock collar 29 having a plurality of teeth 31 on the outer space is rotatably positioned on the shaft 9 with the first end 32 engaging the second side 73 of the friction plate 71. A needle bearing 75 can be positioned in the interior of the lock collar 29 to rotatably position the lock collar with respect to the steering shaft 9. A coil spring 79 is positioned on the shaft 9 with the first end 80 in contact with the second end 33 of the lock collar 29. A no-back washer 65 having engagement teeth 67 is positioned on the steering shaft 9 to secure the coil spring 79 into engagement with the lock collar 29. The position of the no-back washer 65 will determine the amount of the force that the coil spring provides against the lock collar 29 and the friction plate 71. A biasing force from about 170 N to about 1600 N is usually provided by the coil spring 79. The lock collar engages the friction plate 71 and the coil spring 79 with a friction force from about 42 N to about 240 N which will cause the lock collar to rotate with the friction plate 71 as the steering shaft 9 is rotated. The biasing force and friction force can be increased or decreased based on the needs of the vehicle manufacturer. The size of the components, the materials used and the tightness of the no-lock washer will allow the friction clutch to be fine-tuned for the particular requirements of the vehicle. This tunability feature further enhances the usability of the friction clutch for a variety of vehicles and vehicle manufacturers.

An external controller 43, as shown in FIGS. 12-16, having a bolt 45 is positioned adjacent the steering column 7. The external controller can be activated to cause the bolt 45 to engage the teeth 31 on the lock collar 29 and prevent the lock collar 29 from rotating. As the lock collar 29 is frictionally engaged with the friction plate 71 and the coil spring 79, these elements will not be able to rotate when the lock collar is engaged by the bolt 45. As the friction plate 71 is secured to the steering shaft 9, the steering shaft will also be prevented from rotating. If it is desired to have the operator of the vehicle take control of the steering system, it will be necessary for the operator to provide a level of force on the steering wheel that will overcome the frictional force between the friction plate 71 and the coil spring 79 with the lock collar 29. Although the components are somewhat different, the alternative mechanism shown in FIGS. 9-11 function in essentially the same manner as the previously described friction clutch mechanisms.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

Thus, the invention provides, among other things, a {text}. Various features and advantages of the invention are set forth in the following claims.

We claim:

1. Friction clutch mechanism for a steering column of a vehicle comprising:
   a sleeve positioned around a steering shaft of the steering column, the sleeve having a first end and a second end and a plurality of threads being positioned on the second end;
   a lock collar positioned on the sleeve, the lock collar having an outer surface, a plurality of locking teeth positioned on the outer surface;
   a friction washer positioned on the sleeve adjacent a second end of the lock collar;
   a lock nut positioned on the plurality of threads on the second end of the sleeve, the lock nut disposed to engage a side of the friction washer that is not facing the lock collar, the lock nut engaging the friction washer to place a biasing force against the friction washer, the biasing force causing the friction washer to engage the lock collar with a predetermined force; and
   an engagement device for engaging the locking teeth on the lock collar to prevent the lock collar from rotating until the biasing force placed on the lock collar by the friction washer is exceeded, and for disengaging the locking teeth.

2. The mechanism of claim 1 wherein the sleeve has a shoulder positioned on the first end.

3. The mechanism of claim 2, wherein another friction washer is positioned on the sleeve adjacent the shoulder.

4. The mechanism of claim 3, wherein the lock nut places the biasing force against the friction washer adjacent the second end of the lock collar, the lock collar and the another friction washer positioned adjacent the shoulder on the sleeve.

5. The mechanism of claim 1 wherein the engagement device is a bolt slideably positioned in an external controller.

6. The mechanism of claim 5, wherein the bolt has at least one tooth, the at least one tooth on the bolt being disposed to engage the plurality of locking teeth on the outer surface of the lock collar.

7. The mechanism of claim 6, wherein a drive mechanism is disposed to move the bolt into and out of engagement with the plurality of locking teeth on the lock collar.

8. Friction clutch mechanism for a steering column of a vehicle comprising:
   a sleeve positioned around a steering shaft of the steering column, the sleeve having a first end and a second end and a plurality of threads being positioned on the second end;
   a first friction washer positioned on the sleeve;
   a lock collar positioned on the sleeve with a first end adjacent the first friction washer, the lock collar having an outer surface, a plurality of locking teeth positioned on the outer surface;
   a second friction washer positioned on the sleeve adjacent a second end of the lock collar;
   a lock nut positioned on the plurality of threads on the second end of the sleeve, the lock nut disposed to engage a side of the second friction washer that is not facing the lock collar, the lock nut engaging the second friction washer to place a biasing force against the second friction washer, the biasing force causing the second friction washer to engage the lock collar, and the lock collar to engage the first friction washer; and
   an engagement device for engaging the locking teeth on the lock collar and for disengaging the locking teeth.

9. The mechanism of claim 8, wherein the engagement device engaging the locking teeth prevents the lock collar from rotating until the biasing force placed on the lock collar by the friction washers is exceeded.

10. The mechanism of claim 8, wherein the engagement device is a bolt slideably positioned in an external controller.

11. The mechanism of claim 10, wherein a drive mechanism is disposed to move the bolt into and out of engagement with the plurality of locking teeth on the lock collar.

12. The mechanism of claim 11, wherein the bolt has at least one tooth, the at least one tooth on the bolt being disposed to engage the plurality of locking the teeth on the outer surface of the lock collar.

13. The mechanism of claim 8, wherein the sleeve has a shoulder positioned on the first end, and the first friction washer is in contact with the shoulder.

14. The mechanism of claim 13, wherein the engagement device is a bolt slideably positioned in an external controller.

15. The mechanism of claim 14, wherein a drive mechanism is disposed to move the bolt into and out of engagement with the plurality of locking teeth on the lock collar.

16. The mechanism of claim 15, wherein the bolt has at least one tooth, the at least one tooth on the bolt being disposed to engage the plurality of locking the teeth on the outer surface of the lock collar.

17. The mechanism of claim 8, wherein the biasing force generated by the lock nut is from about 90 Newtons to about 1500 Newtons.

18. Friction clutch mechanism for a steering column comprising:
- a sleeve positioned around a steering shaft of the steering column, the sleeve having a first end and a second end and a plurality of threads being positioned on the second end;
- a lock collar positioned on the sleeve, the lock collar having an outer surface, a plurality of locking teeth positioned on the outer surface;
- a friction washer positioned on the sleeve adjacent a second end of the lock collar;
- a lock nut positioned on the plurality of threads on the second end of the sleeve, the lock nut disposed to engage a side of the friction washer that is not facing the lock collar, the lock nut engaging the friction washer to place a biasing force against the friction washer, the biasing force causing the friction washer to engage the lock collar with a predetermined force;
- an engagement device for engaging the locking teeth on the lock collar to prevent the lock collar from rotating until the biasing force placed on the lock collar by the friction washer is exceeded; and
- a drive mechanism configured to move the engagement device into and out of engagement with the plurality of locking teeth of the lock collar.

* * * * *